United States Patent
Kuhn

[19]

[11] Patent Number: 6,128,897
[45] Date of Patent: Oct. 10, 2000

[54] ROTARY INTERNAL COMBUSTION ENGINE

[76] Inventor: Jean Kuhn, Mühlstrasse 23, D-61137 Schöneck-Büdesheim, Germany

[21] Appl. No.: 08/952,424

[22] PCT Filed: May 30, 1996

[86] PCT No.: PCT/EP96/02316

§ 371 Date: Jan. 29, 1998

§ 102(e) Date: Jan. 29, 1998

[87] PCT Pub. No.: WO96/38659

PCT Pub. Date: Dec. 5, 1996

[30] Foreign Application Priority Data

Jun. 1, 1995 [DE] Germany .......................... 195 20 100

[51] Int. Cl.[7] ........................................... F02C 5/00
[52] U.S. Cl. .................. 60/39.75; 60/39.142; 60/39.38
[58] Field of Search ..................... 60/39.142, 39.38, 60/39.4, 39.44, 39.75

[56] References Cited

U.S. PATENT DOCUMENTS

| | | | |
|---|---|---|---|
| 976,236 | 11/1910 | Weiss | 60/39.44 |
| 1,025,117 | 5/1912 | Boyer | 60/39.44 |
| 1,174,439 | 3/1916 | Pelley | 60/39.38 |
| 2,547,560 | 4/1951 | Brodzinsky | 60/39.75 |
| 2,608,058 | 8/1952 | Geeraert | 60/39.38 |
| 2,920,447 | 1/1960 | Hollings | 60/39.142 |
| 3,451,215 | 6/1969 | Barr | 60/39.142 |
| 3,712,274 | 1/1973 | Craft | 60/39.44 |

FOREIGN PATENT DOCUMENTS

| | | |
|---|---|---|
| 801 662 | 8/1936 | France . |
| 22 52 040 | 5/1974 | Germany . |
| OS 2 357 985 | 10/1974 | Germany . |
| 27 57 221 | 7/1979 | Germany . |
| 105 081 | 6/1924 | Switzerland . |

*Primary Examiner*—Ted Kim
*Attorney, Agent, or Firm*—Frishauf, Holtz, Goodman, Langer & Chick, P.C.

[57] ABSTRACT

A rotary engine has a driving shaft and a driving rotor secured in rotation to the driving shaft. The driving rotor has one or several outwardly open rotor chambers distributed around its periphery and each having several inclined pressure application walls that act as a kind of driving blade to convert the explosion pressure into a rotary motion of the rotor. A stator surrounds the driving motor and contains at least one explosion chamber inwardly open toward the driving rotor and provided with an outlet past which the rotor chambers move with at least two pressure application walls at the same time. An electric ignition plug is arranged in each explosion chamber and at least one valve-controlled mixture inlet or a valve-controlled air inlet and a valve-controlled fuel inlet open into the explosion chamber.

28 Claims, 6 Drawing Sheets

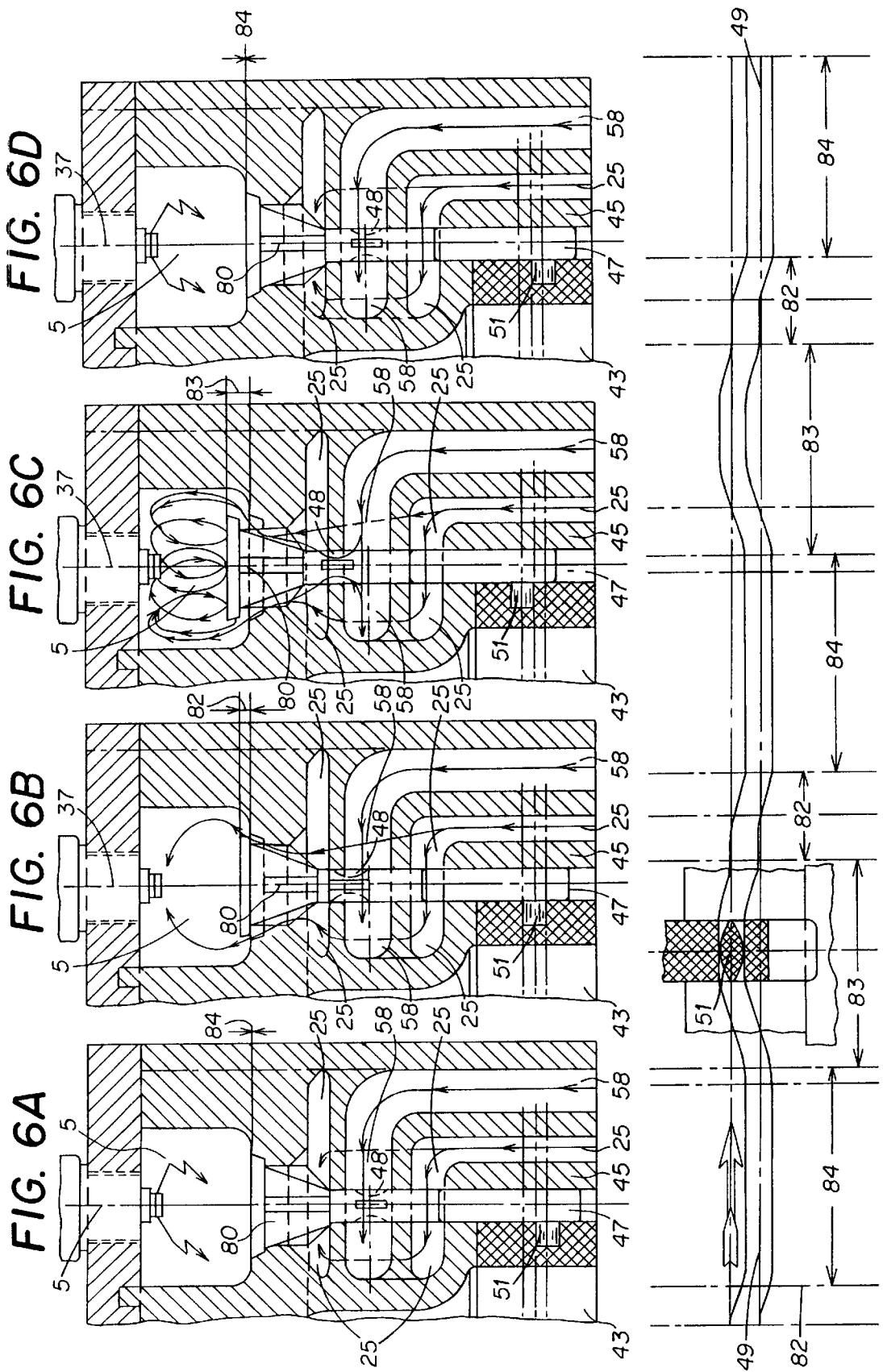

ROTARY INTERNAL COMBUSTION ENGINE

This application is a 371 of PCT/EP96/02316 filed May 30, 1996.

BACKGROUND INFORMATION

1. Field of the Invention

The invention relates to a rotary internal combustion engines.

2. Description of the Related Art

One such rotary engine is known from German Published, Non-Examined Patent Disclosure DE-OS 2 357 985. In it, two diametrical explosion or combustion chambers are present, which open radially to the rotor. The rotor is embodied over its entire circumference with individual rotor chambers, whose walls subject to combustion pressure extend obliquely to the radial direction. Such an engine has the disadvantage among others that radial explosion surges occur, which lead to engine vibration and energy losses. Another problem is sealing off the rotor chambers from the surrounding stator, because the immediately adjacent rotor chambers are sealed off only in linear fashion. This impairs the efficiency. The known engine must be started with a typically electrical starter.

Engines of similar construction have combustion chambers that are valve-controlled in a complicated fashion on the outlet side.

OBJECT AND SUMMARY OF THE INVENTION

The object of the present invention is to embody an internal rotary combustion engine in such a way that with high efficiency it operates very smoothly and starts automatically without a typical electrical starter.

To attain this object, a rotary internal combustion engine of the type defined by the preamble to claim 1 is distinguished according to the invention by the characteristics recited in the body of that claim.

Because of the angular arrangement of each chamber outlet relative to the wall subject to combustion pressure moving past it, and because of its predominant radial orientation, optimal energy yields and vibration-free engine operation are obtained. The pressure-tight machined seat in the region between the rotor chambers adjacent one another but spaced apart relatively widely favors the pressure buildup in the combustion chambers and promotes efficiency. With the external or cooling air aspirated by the aspirating rotor, effective engine cooling is attainable. With the compressor rotor, a supply of compressed air is built up during engine operation in the pressure reservoir, and this supply is utilized for automatic engine starting. Hence a separate electrical starter is unnecessary. In engine operation, the pressure built up in the pressure reservoir is also utilized to supply the combustion chambers with compressed air and fuel that is at the same pressure.

The features recited in claims 2 and 3 allow a gentle connection of the engine as needed to an element that is to be driven. Especially favorable energy conditions are made possible by the refinement of claim 4.

With the provisions of claims 5 and 6, the ignition energy for the spark plugs can be generated in a very simple and rational way in the combustion chambers.

If in accordance with claim 7 during one complete explosion surge walls subject to combustion pressure constantly move past the chamber outlet, major efficiency in conjunction with smooth engine operation is attainable. The embodiment of claim 8 has proven especially advantageous in this respect.

A favorable structural design is obtained by the characteristics of claims 9–13. The exhaust gases can flow into the exhaust gas outlet or removal duct. Choking of the rotor chambers on the outlet side improves the energy conversion. The rotor drive blades that dip into the exhaust gas outlet or removal duct lead to a further improvement in efficiency.

The delivery of fuel and air at the proper time can be accomplished highly expediently with the characteristics of claims 14 and 15.

With the characteristics of claims 16 and 17, the freedom from vibration and the energy yield can be improved.

The features of claims 18–21 enable simple control of the individual operational sequences. The valve slide controls the corresponding connections for the compressed air and for the compressed air compressed by the compressor rotor and supplied to the pressure reservoir. The starting valve upon automatic engine starting controls the inflow of compressed air to the rotor blades of the exhaust gas rotor. As a result, the engine can be started up very simply.

A tank closure operating in three phases as defined by claims 22 and 23 assures an organization as needed of the flow connections in the pressure reservoir. As a result, the fuel tank normally communicating with the pressure reservoir can be temporarily disconnected fluidically from it and vented when the tank is being refilled.

Especially good supplies of compressed air can be stored up in accordance with claim 24 by accomplishing this both internally and externally to the engine.

In the alternative design of claims 25 and 26, the exhaust gas is carried out of the rotor chambers to the outside via openings in the stator that are offset along the circumference relative to the combustion chambers.

An embodiment that is especially preferred from the standpoint of assembly and disassembly is obtained by means of the disklike, clampable design in claim 27.

The further feature of claim 28 includes a preferred type of fuel delivery via a fuel control valve, as well as via a ring line supplied thereby and via individual fuel supply lines.

BRIEF DESCRIPTION OF THE DRAWINGS

The invention will be described below in further detail in terms of exemplary embodiments shown in the drawing wherein

FIGS. 6A, 6B, 6C and 6D show cross-sectional views through the region of a valve, and a cam controller for the valve;

DETAILED DESCRIPTION OF THE PREFERRED EMBODIMENT

Figure 1:
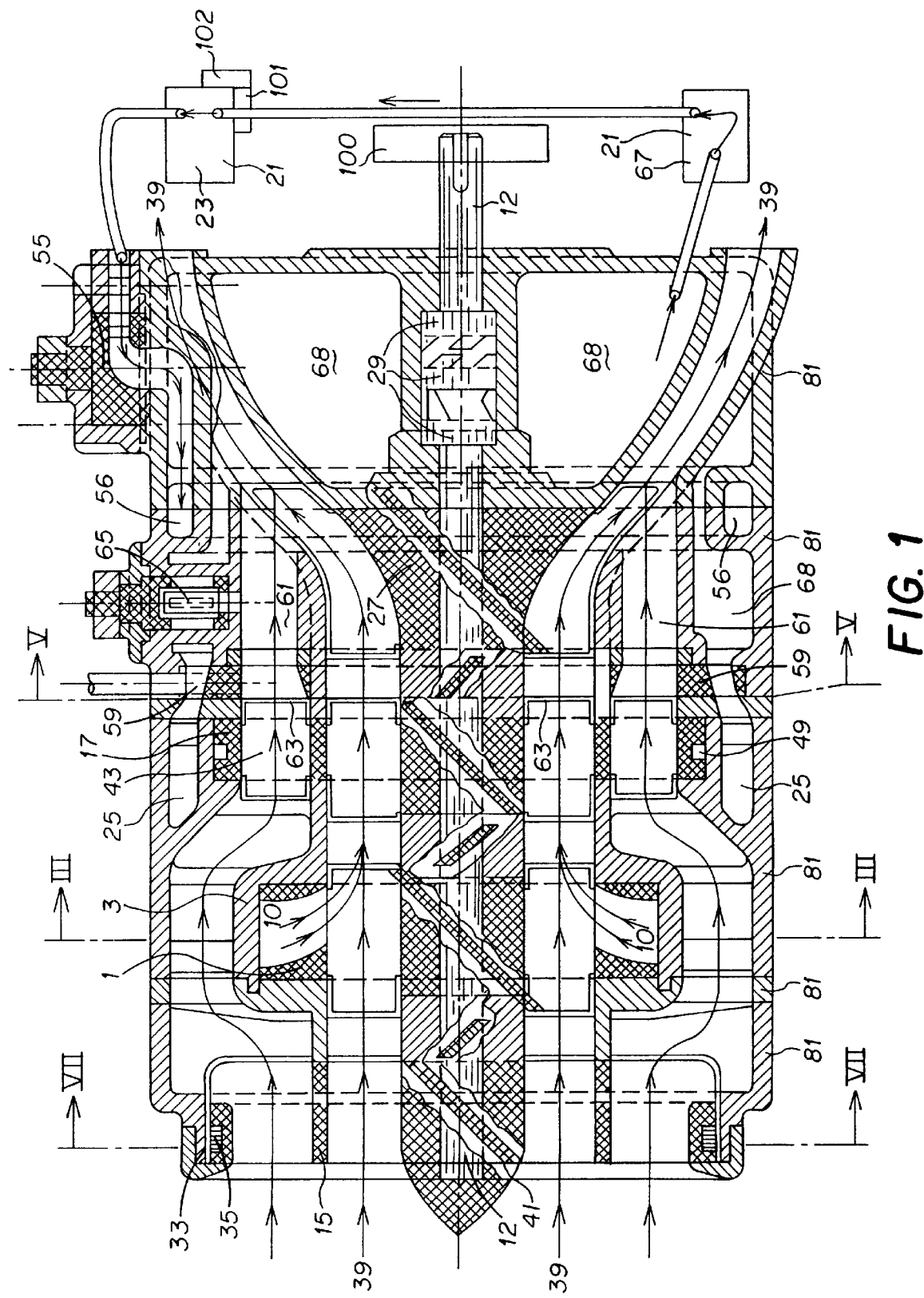
FIG. 1 is a central longitudinal sectional view through a rotary internal combustion engine of the present invention.
Figure 2:
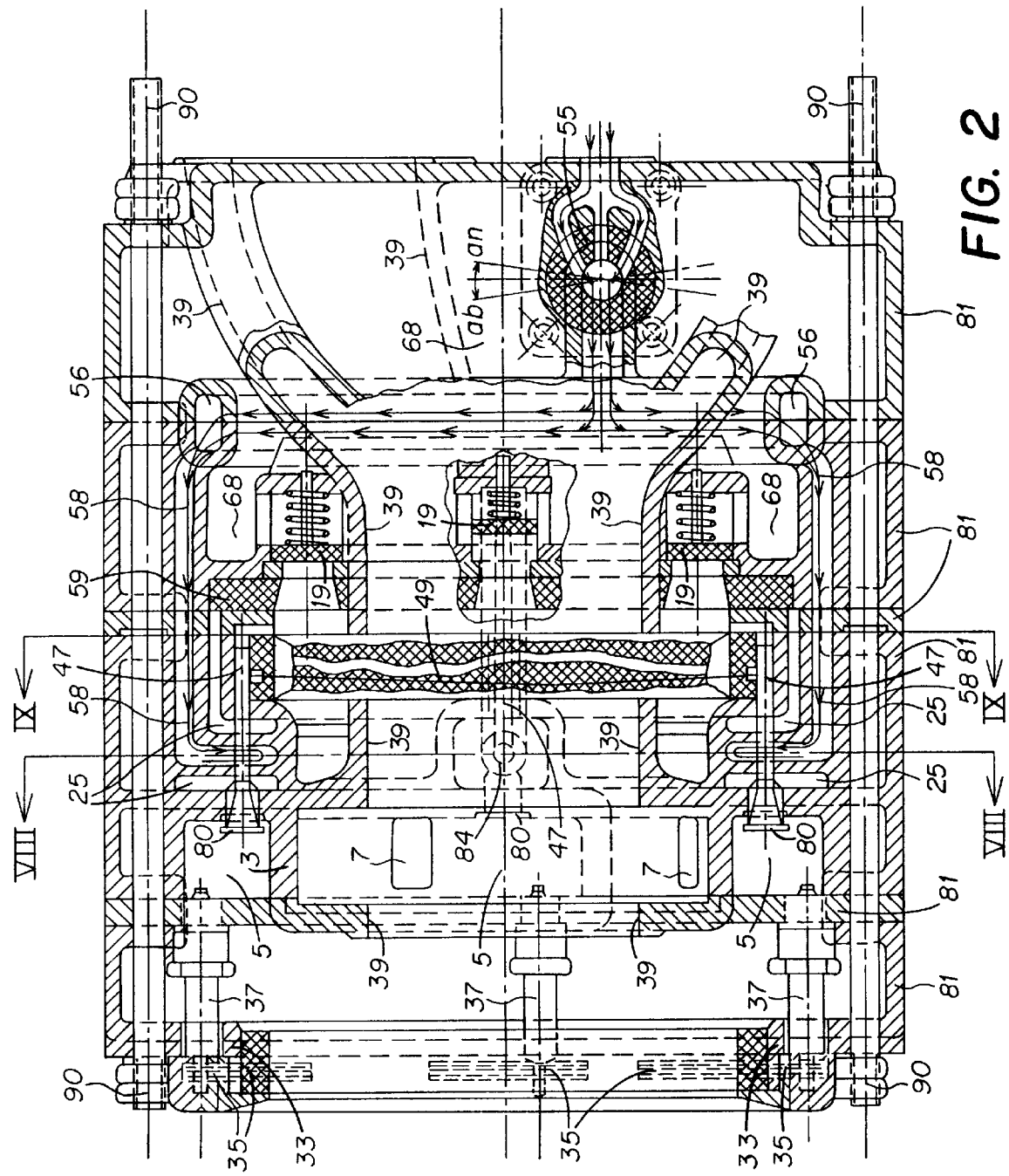
FIG. 2 shows the engine of FIG. 1 in a longitudinal section offset from that view.

In FIGS. 1 and 2, a plurality of disklike engine elements 81 are arranged concentrically one after the other and clamped by peripheral threaded bolts 90. Such an engine comprising modules can be assembled and disassembled very simply by slipping the individual modules onto a central drive shaft 12 in wedged fashion, fixed against relative rotation, and longitudinally clamping them. The bolts may each have a bolt shoulder that enables separate assembly and disassembly of the engine parts on the two sides of the bolt shoulder.

The drive shaft 12 is connected via a centrifugal coupling 29 in FIG. 1 to an output shaft, which in turn is coupled to an element to be driven. In a manner not shown, the centrifugal coupling can be followed immediately by an energy-storing rotary mass, such as a flywheel 100.

This flywheel can temporarily drive the element to be driven during operation even if the centrifugal coupling has become unsnapped. Preferably this is a detent coupling, which snaps gently into engagement as the engine runs up to speed, when a certain rpm difference is exceeded, and comes unsnapped gently when the engine runs to a stop or becomes overly slow relative to the rotary mass.

Figure 4:
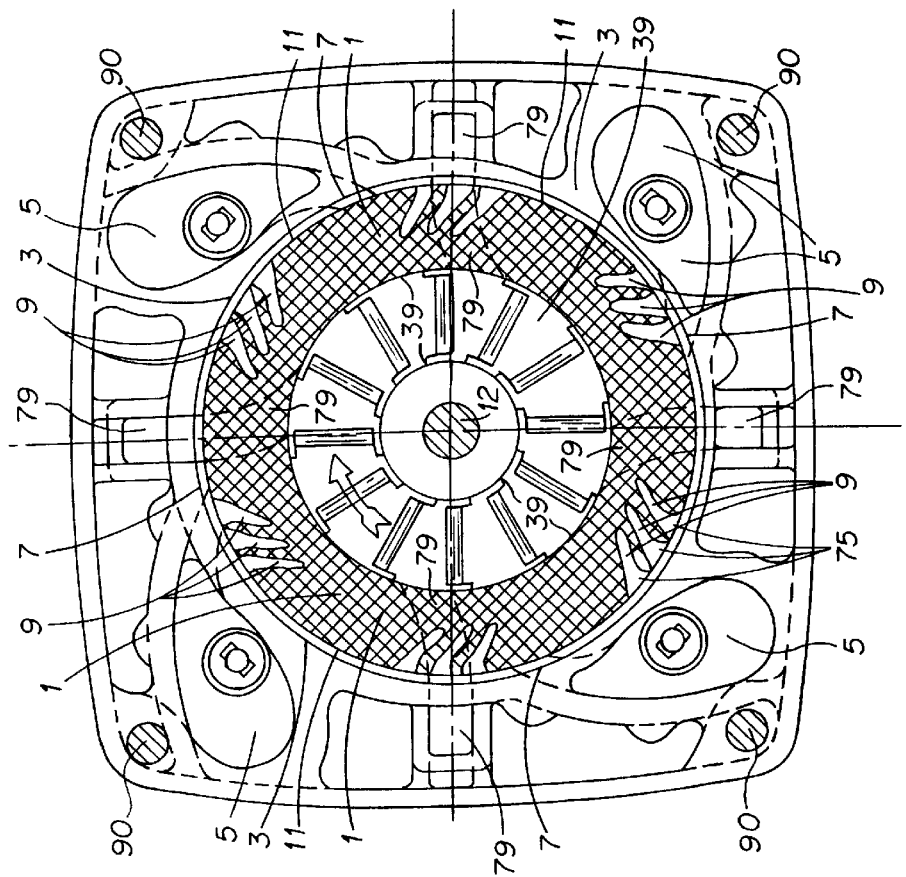
FIG. 4 show in a cross sectional view corresponding to FIG. 3, an alternative engine having only outward-opening rotor chambers and having external exhaust gas outlet openings.
Figure 3:
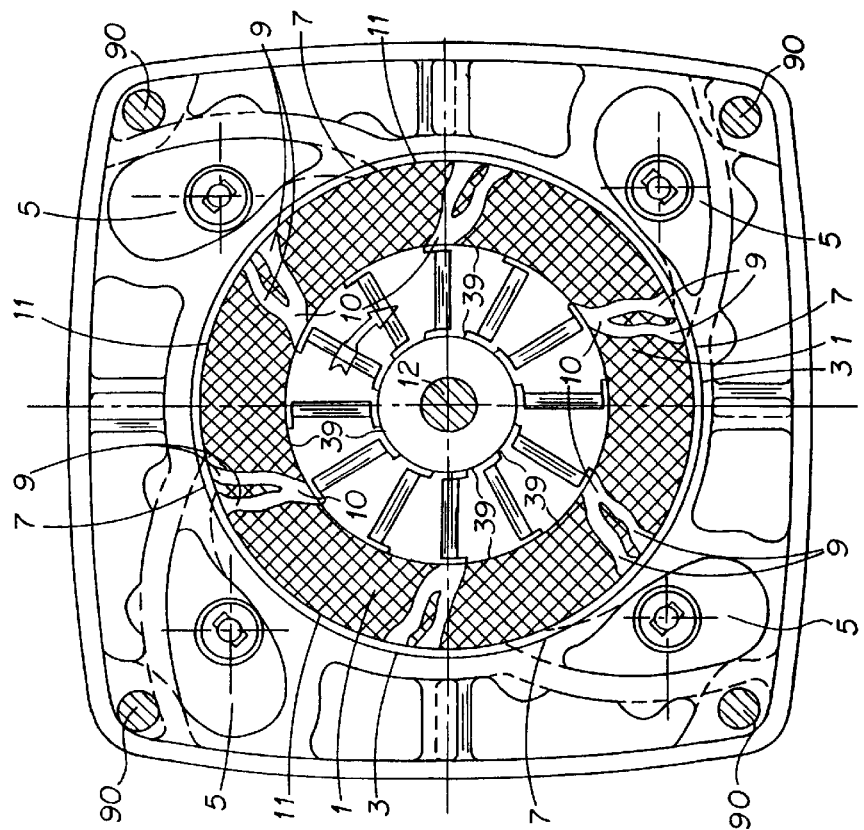
FIG. 3 is a cross sectional view through the engine of FIG. 1 taken along the line III—III of FIG. 1.

The key point of the engine is embodied by a drive rotor 1, with a stator 3 associated with it. As shown in FIGS. 3 and 4, in the present case four uniformly distributed explosion or combustion chambers 5 are provided in the stator 3, with their valveless chamber outlets 7 extending predominantly at a tangent to the rotor circumference. As shown in FIG. 2, one spark plug 37 and one valve 80 on a valve rod 47 protrude into each combustion chamber 5 to deliver compressed air and fuel that is at the same pressure. When the fuel-air mixture is made to explode, the explosion pressure can be discharged via the chamber outlet 7 predominantly at a tangent inward into a rotor chamber 10 (FIG. 3) or 75 (FIG. 4) of the drive rotor 1.

In the circumferential region of the drive rotor 1, in the present case, six uniformly distributed rotor chambers 10 (FIG. 3) and 75 (FIG. 4) are formed, each having a plurality of walls subject to combustion pressure 9 extending approximately radially; specifically, in FIG. 3 there are two walls subject to combustion pressure 9 and in FIG. 4 there are three (in terms of the direction of drive rotation).

Between the drive rotor 1 and its stator 3, a relatively narrow machined seat is provided, which allows problem-free and wear-free rotation of the rotor and at the same time assures extensive pressure sealing between these parts whenever the chamber outlet 7 is opposite the rotor circumference rather than a rotor chamber 10 or 75. The mixture in the combustion chambers is correspondingly ignited in synchronized fashion whenever a rotor chamber is just beginning to move past. Hence the explosion pressure can act from the very outset approximately at a right angle on the walls subject to combustion pressure 9 moving past in succession, which leads to rotation of the rotor.

The rotor chambers 10 of FIG. 3 communicate on their radial inner side—preferably via a certain choking—with a central, annular exhaust gas outlet or removal duct 39, which as shown in FIG. 1 extends to the outside at the engine outlet. In contrast to this, the rotor chambers 75 of FIG. 4 are closed on the inside. Here, the exhaust gas is carried out via external exhaust gas outlet openings 79 (which communicate with the central exhaust gas outlet or removal duct 39 as in FIG. 3) in the stator 3, as soon as the rotor chambers 75, after the explosion events, move past these outlet openings. After the explosion, the exhaust gas can flow out of the associated rotor chamber 10 or 75 as described above.

Figure 7:
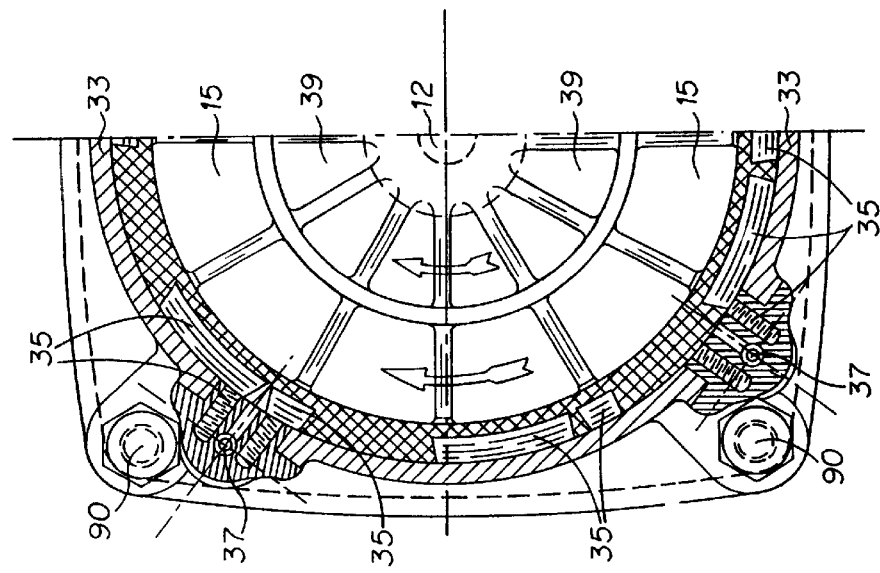
FIG. 7 is a cross sectional view taken along the line VII—VII of FIG. 1 to illustrate ignition means.

The drive rotor 1 is preceded by an aspirating rotor 15, rotating in slaved fashion with it, that has a stator 33. This aspirating rotor aspirates external or cooling air, which in turn is carried for cooling through the drive rotor 1 and via and/or through the stator 3 surrounding it and having the combustion chamber or combustion chambers 5. In the present case, the aspirating rotor 15 and its stator 33 are embodied as in FIG. 7 with electromagnetic ignition means 35, which are connected to the spark plugs 37. Upon rotation of the aspirating rotor 15, ignition pulses synchronized thereby are generated for the explosion events in the combustion chambers 5.

The drive rotor 1 is followed by a compressor rotor 17, 43, rotating in slaved fashion with it, with a stator 45. The rotor compresses the external or cooling air carried to it during engine operation from the aspirating rotor 15 via the drive rotor 1 and its stator 3. In engine operation, the compressed air present on the compression side 63 of the compressor rotor 17, 43 proceeds at least in part via a more or less wide-open valve slide 59 and via check valves 19 following the latter to reach a pressure reservoir 21. If the valve slide 59 is not fully open in partial-load operation, then some of the compressed air from the compression side 63 passes via the valve slide 59 to outward-opening outflow ducts 61 that discharge into the exhaust gas outlet or removal duct 39. When the valve slide 59 is closed, the compression side 63 communicates only with the outflow ducts 61.

The pressure reservoir 21 includes an external fuel tank 23 including valve 101 and tank closure cap 102, and a compressed air chamber that normally communicates fluidically with it, which in the present case comprises an external compressed air chamber 67 and communicating with it a compressed air chamber 68 that is internal to the engine. Thus during engine operation, a relatively large supply of compressed air, required for engine operation and for starting the engine, can be built up and stored in the pressure reservoir 21.

During engine operation, the compressed air passes out of the compressed air chamber 68 via the more or less wide-open valve slide 59 to a mixture forming prechamber 25, which can be seen in FIGS. 2 and 6. As soon as the valve 80 in FIG. 6 leading to the combustion chamber 5, as a result of a valve control cam 51 on the valve rod 47 moves out of a closing position 84 (valve stroke 3) to a first, smaller opening position 82 (valve stroke 1), initially only compressed air flows into the combustion chamber 5. As the valve opens wider, up to a second opening position 83 (valve stroke 2), finally the fuel at the same overpressure (from the fuel tank 23 via a ring line 56 and via fuel supply lines 58) likewise reaches the combustion chamber 5, via an additional or tappet valve 48 that then opens and is embodied on or connected to the valve rod 47 (and via the aforementioned valve 80). After that, the valve 80 is returned to the closing position 84 (valve stroke 3), and the mixture is ignited. The valve stroke sequence described is repeated accordingly.

Figure 9:
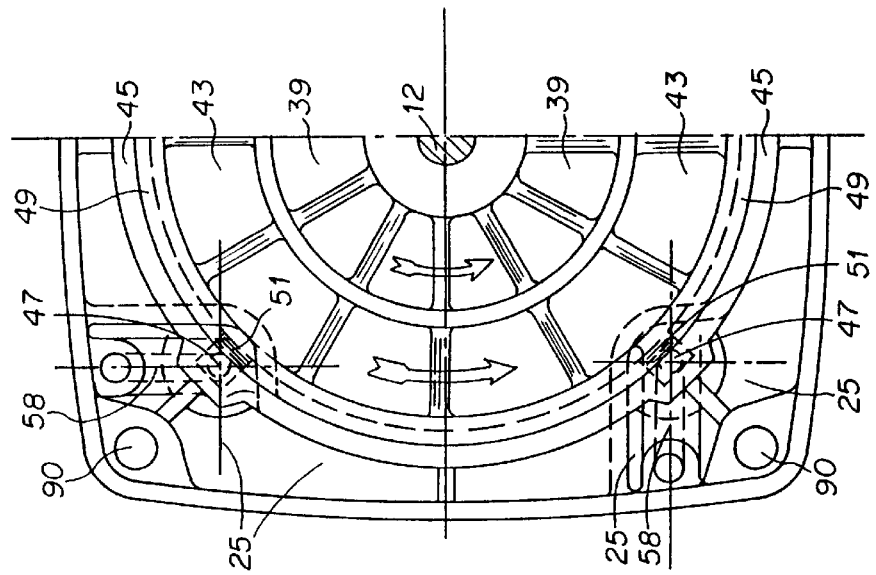
FIG. 9 is a view taken along the line IX—IX of FIG. 2 to illustrate a valve cam controller.
Figure 8:
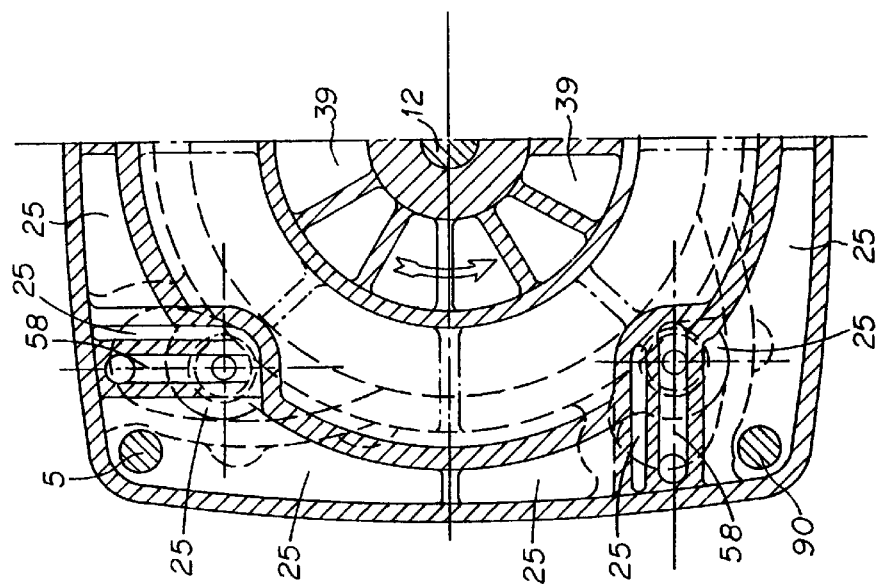
FIG. 8 is a cross sectional view taken along the line VIII—VIII of FIG. 2 to illustrate fuel delivery.

The valve control cam 51, as shown in FIGS. 6 and 9, engages a correspondingly shaped cam track 49, which in the present case is embodied on the compressor rotor 17, 43 and rotates with it. As a result, the control cam 51 (during valve strokes 1, 2 and 3), via the valve rod 47, can control the described synchronized delivery of compressed air and fuel under pressure.

Finally, the compressor rotor 17, 43 is also followed by an exhaust gas rotor 27 that also rotates in slaved fashion via the drive shaft 12. When the engine is started, compressed air stored in the pressure reservoir 21 is carried via an intermittently opened starting valve 65 to the rotor blades of the exhaust gas rotor 27, so that the engine can be set into rotation solely by means of this compressed air. For engine starting, the valve slide 59 is also opened, so that the combustion chambers 5 under valve control can be filled with the mixture to be ignited, and once engine starting has occurred, compressed air compressed by the compressor rotor 17, 43 can pass via the check valves 19 to reach the pressure reservoir 21, so that the pressure reservoir remains constantly charged for operation and for any later engine starting.

For the sake of an improved energy yield, some rotor blades 41, which belong to the four rotors 1, 15, 17, 27, dip into the exhaust gas outlet or removal duct 39.

Figure 5B:
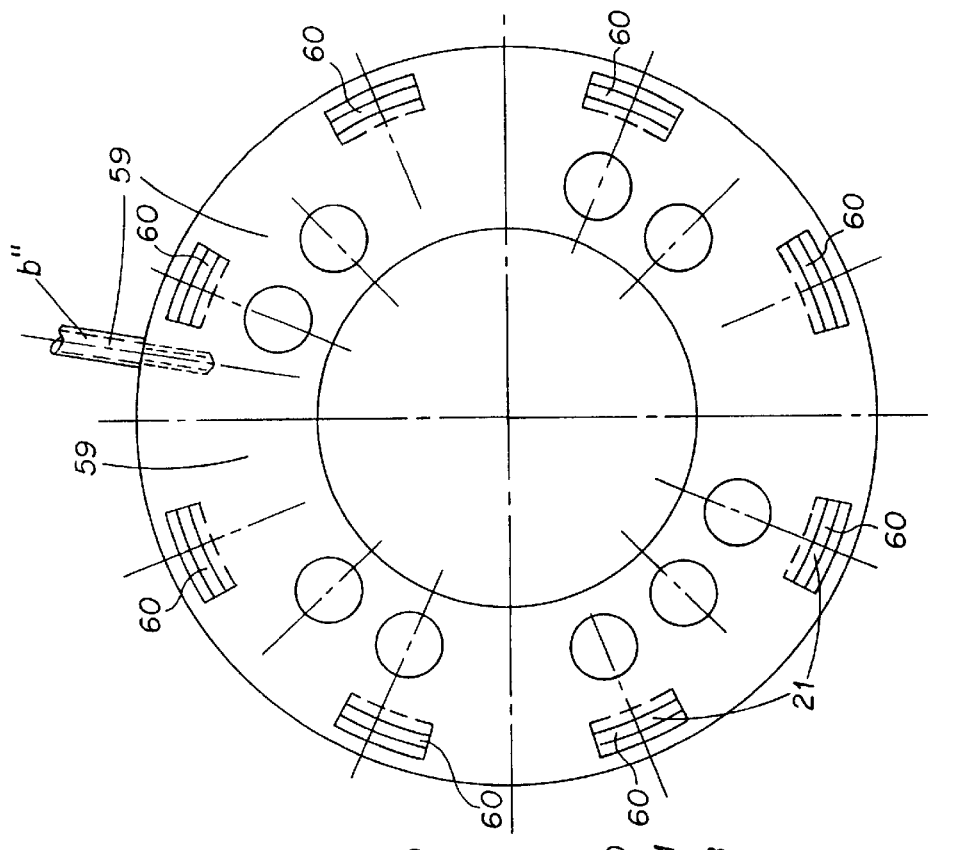
FIGS. 5A and 5B are views taken along the line V—V of FIG. 1 of a rotatable valve slide.
Figure 5A:
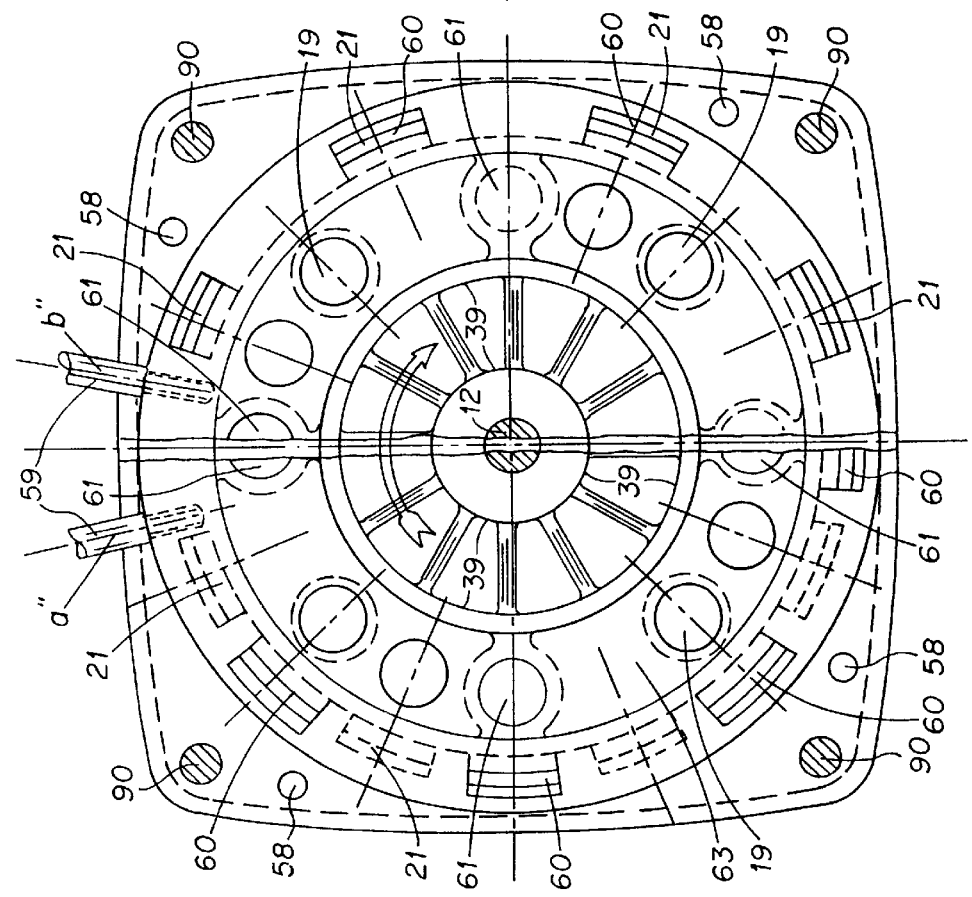

In FIG. 5, the valve slide 59 is rotatable between a completely closed position a and a completely opened position b. In the closed position (FIG. 5, left portion of the left drawing), the outer compressed air connections 60 (radially outer openings on the valve slide 59) from the pressure reservoir 21 to the mixture forming prechamber 25 are interrupted. The flow connections between the compression side 63 of the compressor rotor 17, 43 and the check valves 19 are interrupted as well. However, the compression side 63 communicates with the outflow duct 61 via the valve slide 59. In the open position (FIG. 5, right-hand portion of the left drawing, and FIG. 5, right drawing), the outer compressed air connections 60 from the pressure reservoir 21 to the mixture forming prechamber 25 are opened. The flow connections between the compression side 63 of the compressor rotor 17, 43 and the check valves 19 are also opened. However, the compression side 63 is disconnected from the outflow duct 61 via the valve slide 59. In the intermediate positions of the valve slide 59 located between the extreme positions, the aforementioned flow connections can be varied between fully open and fully closed; the connection with the outflow duct 61 is adjusted in contrary fashion to the other connections. Thus with the valve slide 59, in conjunction with a fuel control valve 55, the engine output and engine rpm can be varied. Each time the engine is in operation, the pressure reservoir 21 is recharged for a new engine start.

The aforementioned fuel control valve 55 is located in FIG. 1 in the flow connection between the fuel tank 23 and the ring line 56. For shutting off the engine it can be closed, and for engine operation, for supplying fuel to the ring line 56, it can be opened more or less widely. The function of the fuel control valve 55 can be manually controllable and/or may be coupled with that of the valve slide 59 by known linking means. The ring line 56 communicates with the region surrounding the corresponding additional or tappet valve 58 each via a respective fuel supply line 58, in which a fuel check valve, not shown, is located. When the fuel control valve 55 is open, the fuel in the ring line 56 is under pressure, and so the aforementioned fuel check valves in the fuel supply lines 58 are opened under pressure control, and replenishing fuel can flow in. If conversely the fuel control valve 55 is closed, then the pressure in the ring line 56 drops, and so the fuel check valves close and no further fuel can emerge from the ring line. For shutting off the engine, the fuel control valve 55 and the valve slide 59 for the compressed air are thus closed. Although the valves 80 and 48 continue to function under cam control as the engine slows down to a stop, still no further mixture can be formed, for the above reasons.

The starting valve 65 is temporarily opened only for engine starting, in which the valve slide 59 is also opened, so that the compressed air can start up the engine. After engine starting, the starting valve 65 is closed manually or automatically.

The fuel tank 43 that forms one part of the pressure reservoir 21 is provided with a separate tank closure, not shown, which assures that for tank filling the fuel tank is fluidically temporarily disconnected from the pressure reservoir and vented. To that end, a tank closure cap has four rotational positions. In the first rotational position (normal or operating position), the fuel tank 23 communicates with the pressure reservoir 21, and a tank vent is closed. In the second rotational position (first actuation phase), the communication with the pressure reservoir 21 is interrupted by a valve, and the tank vent is still closed. In the second rotational position (second actuation phase), the tank vent (valve) is opened, so that a pressure equilibrium with the ambient pressure can be established in the fuel tank 23. In the fourth rotational position (third actuation phase), which is attainable only in delayed fashion with a view to the requisite pressure equilibrium, the tank closure cap can be removed. After the tank is filled, the rotational positions of the tank closure cap are gone through in reverse order, until the normal or operating position is again attained. The individual parts of the tank closure may all be integrated into a correspondingly embodied, compact tank closure cap.

I claim:

1. A rotary internal combustion engine comprising:

a drive shaft, a drive rotor connected to the drive shaft in a manner fixed against relative rotation, the drive rotor having one or more peripherally distributed rotor chambers that open outwardly and each having a plurality of obliquely extending walls subject to combustion pressure, acting as a kind of drive blade, for converting the combustion pressure into a rotary motion of the rotor, and a stator surrounding the drive rotor having at least one explosion or combustion chamber which opens inwardly toward the drive rotor and having a chamber outlet, past which the rotor chambers move, each rotor chamber having at least two walls simultaneously subject to combustion pressure, wherein at least a portion of an electrical spark plug is disposed within each combustion chamber and at least one mixture inlet or one air inlet and one fuel inlet, each discharge under valve control into each combustion chamber, wherein each chamber outlet (7) of each combustion chamber (5), which on the chamber outlet side is valveless, is oriented approximately at a right angle to each wall that is subject to combustion pressure (9) of each said rotor chamber (10, 75), and each chamber outlet (7) is arranged predominantly at a tangent to a direction of rotor rotation and each wall that is subject to combustion pressure (9) is arranged predominantly radially;

wherein one continuous, narrow machined seat (11), which allows rotor rotations and is largely pressure-tight with respect to explosion surges, is provided between the drive rotor (1) and its stator (3), in each case between circumferentially relatively widely spaced adjacent rotor chambers (10, 75);

wherein an aspirating rotor (15) is arranged on the drive shaft (12) and is connected to the drive shaft in a manner fixed against relative rotation, the aspirating rotor preceding the drive rotor (1) and aspirating external or cooling air, which for cooling is carried through the drive rotor (1) and via and/or through the stator (3) surrounding the drive rotor with the combustion chambers (5);

wherein a compressor rotor (17, 43) is arranged on the drive shaft (12) and is connected to the drive shaft in a manner fixed against relative rotation, the compressor rotor following the drive rotor (1) and compressing the external or cooling air provided thereto during engine operation from the aspirating rotor (15) via the drive rotor (1) and the stator (3);

wherein during engine operation the compressed external or cooling air passes via at least one check valve (19) to a pressure reservoir (21) having a compressed air chamber (67) and a fuel tank (23);

wherein for an engine starting operation and for engine operation, the pressure reservoir is coupled with at least one valve-controlled mixture forming prechamber (25) leading to the combustion chamber; and wherein during the engine starting operation, the pressure reservoir is in fluid communication with rotor blades of an exhaust gas rotor (27) connected to the drive shaft (12), and after the engine has been stopped the compressed air from the pressure reservoir initially serves to directly provide self-starting of the engine.

2. The rotary engine of claim 1, wherein the drive shaft (12) is coupled at an engine outlet to a centrifugal coupling (29) that can be connected to an element to be driven.

3. The rotary engine of claim 2, wherein the centrifugal coupling (29) includes a detent coupling, which gently snaps into engagement as the engine runs up to speed, if a certain rpm difference is exceeded, and which gently snaps out of engagement when the engine slows down to a stop.

4. The rotary engine of claim 2, wherein the centrifugal coupling is followed by an energy-storing rotary mass that is connectable to the element to be driven.

5. The rotary engine of claim 4 wherein the energy-storing rotary mass is a flywheel.

6. The rotary engine of claim 1, wherein an aspirating rotor (15), connected in a manner fixed against relative rotation to the drive shaft (12), and a stator (33) surrounding the rotor has electromagnetic ignition means (35) for generating electrical ignition energy for the spark plugs (37) of each combustion chamber (5).

7. The rotary engine of claim 6, wherein the electromagnetic ignition means (35) are arranged on the aspirating rotor (15) and on a stator (33) surrounding the electromagnetic ignition means.

8. The rotary engine of claim 1, wherein a number and arrangement of the walls subject to combustion pressure (9) of each rotor chamber (10, 75) during the entire explosion surge in a combustion chamber (5), at least at a rated rpm, move constantly past the chamber outlet (7).

9. The rotary engine of claim 1, wherein due to a number and arrangement of the rotor (10, 75) and combustion chambers (5) and an open- or closed-loop control of the explosion events, at the onset of each explosion surge, at least the first two walls subject to combustion pressure (9) in a circumferential direction move past the chamber outlet (7).

10. The rotary engine of claim 1, wherein that the rotor chambers (10) discharge in a direction toward the interior of the drive rotor (1) into at least one longitudinal, outward-opening exhaust gas outlet or removal duct (39).

11. The rotary engine of claim 9, wherein that the rotor chambers (10) on the outlet side are fluidically choked toward the at least one exhaust gas outlet or removal duct (39).

12. The rotary engine of claim 9, wherein to improve the energy yield, rotor drive blades (41) connected to the drive shaft (12) dip into the at least one exhaust gas outlet or removal duct (39).

13. The rotary engine of claim 11, wherein at least some of the rotor drive blades (41) belong to the drive rotor (1).

14. The rotary engine of claim 10, wherein the exhaust gas outlet or removal duct (39) has a flow therethrough of air that is delivered by the aspirating rotor (15) and which mixes with the exhaust gas from the rotor chambers (10).

15. The rotary engine of claim 1, wherein the compressor rotor (17, 43) and its stator (45) are embodied with mechanical, magnetic or electrical valve control means (47, 49, 51) for delivering both fuel and air at the proper time to each combustion chamber (5).

16. The rotary engine of claim 15, wherein the valve control means has a cam track (49) moving in slaved fashion with the compressor rotor (43), which track is engaged for each valve by one valve control cam (51); wherein upon each valve cycle, in a first valve stroke (82) with medium valve travel, compressed air from the mixture forming prechamber (25) reaches the corresponding combustion chamber (5) and at least partially removes exhaust gas from the corresponding combustion chamber; wherein simultaneously or subsequently in a second valve stroke (83) with full valve travel, the compressed air also passes via the mixture forming prechamber (25) into the combustion chamber (5); and wherein subsequently in a third valve stroke (84), the communication between the mixture forming prechamber and the combustion chamber is interrupted, and the mixture in the combustion chamber is ignited.

17. The rotary engine of claim 1, wherein at least two combustion chambers (5) are present.

18. The rotary engine of claim 1, further comprising a manually actuatable valve slide (59) functioning as a valve connection between the pressure reservoir (21) and the mixture forming prechamber (25) and between the pressure reservoir and a compression side (63), the manually actuatable valve slide providing the compressed external or cooling air of the compressor rotor (17, 43) and the at least one check valve (19) and/or an outward-leading outflow duct (61) of no longer needed external or cooling air.

19. The rotary engine of claim 18, wherein upon starting the engine, the valve slide (59) closes the outflow duct (61) for compressed external or cooling air, and also causes a compressed air region of the pressure reservoir (21) to communicate with the region of the mixture forming prechamber (25) and causes the compression side (63) of the compressor rotor (43) to communicate with the at least one check valve (19), while at the same time compressed air from the compressed air chamber (67, 68) of the pressure reservoir (21) passes via a temporarily open starting valve (65) to reach the rotor blades of the exhaust gas rotor (27).

20. The rotary engine of claim 19, wherein after starting the engine, the starting valve (65) is manually or automatically closed, and the adjustable valve slide (59) more or less widely opens the compressed air connections (60), from the compressed air chamber (67, 68) of the pressure reservoir (21) to the mixture forming prechamber (25) and from the compression side (63) of the compressor rotor (43), first to the at least one check valve (19), and thus to the pressure reservoir (21), and second to the outflow duct (61) for compressed external or cooling air, in accordance with a desired or required engine output or engine rpm.

21. The rotary engine of claim 19, wherein for stopping the engine, the valve slide (59) fully opens the outflow duct (61) for compressed external or cooling air and fully closes the compressed air connections from the pressure reservoir (21) to the mixture forming prechamber (25) and from the compression side (63) of the compressor rotor (43) to the at least one check valve (19) and thus to the pressure reservoir.

22. The rotary engine of claim 1, wherein the fuel tank (23) belonging to the pressure reservoir (21) has a tank closure operating in three phases, which to prepare for tank filling, in a first actuation phase, by rotation of a tank closure cap closes a valve between the fuel tank (23) and the compressed air chamber (67) of the pressure reservoir (21), which then in a second actuation phase by further rotation of the tank closure cap also vents the fuel tank via the valve and then, after a pressure equilibrium has been established, in a third actuation phase by rotating the tank closure cap again, additionally allows the tank cap to be removed and allows filling of the fuel tank through the now-open tank closure, and after the tank is filled the tank closure cap is placed on the tank closure, the venting is terminated, and the communication between the fuel tank and the compressed air chamber of the pressure reservoir is then reestablished.

23. The rotary engine of claim 22, further comprising an intermittent locking of motion between the second and third actuation phases, for achieving a pressure equilibrium.

24. The rotary engine of claim 1, wherein the compressed air chamber of the pressure reservoir (21) has one chamber region (68) internal to the engine and one chamber region (67) external to the engine.

25. The rotary engine of claim 1, wherein the rotor chambers (75) are open outwardly, and that in the surrounding stator (3) each combustion chamber (5) is followed in the circumferential direction, in spaced-apart fashion, by an exhaust gas outlet opening (79), into which the exhaust gas and the overpressure from the rotor chambers moving past can be diverted.

26. The rotary engine of claim 25, wherein the exhaust gas outlet openings (79) in the stator (3) communicate with an outwardly opening central exhaust gas outlet or removal duct (39).

27. The rotary engine of claim 1, further comprising a plurality of modular engine elements (81) of disklike shape, arranged coaxially one after the other and releasably clamped together.

28. The rotary engine of claim 1, further comprising a fuel control device (55) in a fuel flow connection between the fuel tank (23) and a ring line (56), which communicates via fuel supply lines (58), in which check valves are built in, with the regions of the mixture forming prechambers (25), or with cam-controlled additional valves (47) preceding these prechambers.

* * * * *